United States Patent
Smith et al.

(10) Patent No.: US 9,350,871 B2
(45) Date of Patent: *May 24, 2016

(54) DELIVERY OF ALARM SYSTEM EVENT DATA AND AUDIO OVER HYBRID NETWORKS

(71) Applicant: Numerex Corp., Atlanta, GA (US)

(72) Inventors: Jeffery O. Smith, Dallas, TX (US); Michael Gregory, Carrollton, TX (US); Tomás Murray, Atlanta, GA (US); Eugene D. Ary, Flower Mound, TX (US)

(73) Assignee: Numerex Corp., Atlanta, GA (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/185,209

(22) Filed: Feb. 20, 2014

(65) Prior Publication Data

US 2014/0169535 A1  Jun. 19, 2014

Related U.S. Application Data

(63) Continuation of application No. 13/413,333, filed on Mar. 6, 2012, now Pat. No. 8,705,704.

(60) Provisional application No. 61/471,558, filed on Apr. 4, 2011.

(51) Int. Cl.
  *H04M 11/00* (2006.01)
  *H04M 7/00* (2006.01)
  (Continued)

(52) U.S. Cl.
  CPC .............. *H04M 7/009* (2013.01); *G08B 25/006* (2013.01); *G08B 25/08* (2013.01); *H04M 11/04* (2013.01); *H04M 3/42314* (2013.01)

(58) Field of Classification Search
  CPC ..... H04M 11/04; H04M 7/0057; G08B 25/08
  USPC ....................................... 379/37–45
  See application file for complete search history.

(56) References Cited

U.S. PATENT DOCUMENTS

| 4,465,904 A | 8/1984 | Gottsegen et al. |
| 4,692,742 A | 9/1987 | Raizen et al. |

(Continued)

FOREIGN PATENT DOCUMENTS

| EP | 2282503 | 2/2011 |
| WO | WO 2009/009102 | 1/2009 |

OTHER PUBLICATIONS

Supplementary European Search Report for European Patent Application No. 12768554.3, issued Oct. 17, 2014.

(Continued)

*Primary Examiner* — Stella L Woo
(74) *Attorney, Agent, or Firm* — King & Spaulding

(57) ABSTRACT

Delivery of alarm system event data and audio over hybrid networks is described. In one embodiment, delivering alarm system event data includes detecting an alarm event and communicating alarm event data to a message processing gateway, evaluating service parameters of the alarm system and conditions of the alarm event data, forwarding the alarm event data and a voice channel code to a telecommunications switch, and opening a voice channel between the telecommunications switch and a central alarm monitoring station. In other aspects, delivering alarm system event data and connecting a voice channel further includes determining whether the voice channel remains open, forwarding a routing code to the alarm system, opening a voice channel between the alarm system and the telecommunications switch, and bridging the voice channel between the telecommunications switch and the central alarm monitoring station and the voice channel between the alarm system and the telecommunications switch.

28 Claims, 6 Drawing Sheets

(51) Int. Cl.
*H04M 11/04* (2006.01)
*G08B 25/00* (2006.01)
*G08B 25/08* (2006.01)
*H04M 3/42* (2006.01)

(56) References Cited

U.S. PATENT DOCUMENTS

| | | | |
|---|---|---|---|
| 4,918,717 A | 4/1990 | Bissonnette et al. | |
| 5,134,644 A | 7/1992 | Garton et al. | |
| 5,195,126 A | 3/1993 | Carrier et al. | |
| 5,365,568 A | 11/1994 | Gilbert | |
| 5,400,011 A | 3/1995 | Sutton | |
| 5,463,595 A | 10/1995 | Rodhall | |
| 5,568,475 A | 10/1996 | Doshi et al. | |
| 5,736,927 A | 4/1998 | Stebbins et al. | |
| 5,796,633 A | 8/1998 | Burgess et al. | |
| 5,808,547 A | 9/1998 | Carney | |
| 5,838,223 A | 11/1998 | Gallant et al. | |
| 5,877,684 A | 3/1999 | Lu | |
| 5,923,731 A | 7/1999 | McClure | |
| 5,940,474 A | 8/1999 | Ruus | |
| 6,075,451 A | 6/2000 | Lebowitz et al. | |
| 6,215,404 B1 | 4/2001 | Morales | |
| 6,243,373 B1 | 6/2001 | Turock | |
| 6,272,212 B1 | 8/2001 | Wulforst et al. | |
| 6,288,642 B1 | 9/2001 | Dohrmann | |
| 6,311,072 B1 | 10/2001 | Barclay et al. | |
| 6,369,705 B1 | 4/2002 | Kennedy | |
| 6,381,307 B1 | 4/2002 | Jeffers et al. | |
| 6,400,265 B1 | 6/2002 | Saylor et al. | |
| 6,438,124 B1 | 8/2002 | Wilkes et al. | |
| 6,452,490 B1 | 9/2002 | Garland et al. | |
| 649,343 A1 | 12/2002 | Petricoin | |
| 6,553,100 B1 | 4/2003 | Chen et al. | |
| 6,574,480 B1 | 6/2003 | Foladare et al. | |
| 6,577,234 B1 | 6/2003 | Dohrmann | |
| 6,603,845 B2 | 8/2003 | Jensen et al. | |
| 6,661,340 B1 | 12/2003 | Saylor et al. | |
| 6,683,526 B2 | 1/2004 | Bellin | |
| 6,829,478 B1 | 12/2004 | Layton et al. | |
| 6,831,557 B1 | 12/2004 | Hess | |
| 6,870,906 B2 | 3/2005 | Dawson | |
| 6,928,148 B2 | 8/2005 | Simon et al. | |
| 6,965,313 B1 | 11/2005 | Saylor et al. | |
| 6,973,165 B2 | 12/2005 | Giacopelli et al. | |
| 7,002,462 B2 | 2/2006 | Welch | |
| 7,009,519 B2 | 3/2006 | Leonard et al. | |
| 7,103,152 B2 | 9/2006 | Naidoo et al. | |
| 7,113,090 B1 | 9/2006 | Saylor et al. | |
| 7,119,609 B2 | 10/2006 | Naidoo et al. | |
| 7,245,703 B2 | 7/2007 | Elliot et al. | |
| 7,262,690 B2 | 8/2007 | Heaton et al. | |
| 7,406,710 B1 | 7/2008 | Zellner et al. | |
| 7,429,921 B2 | 9/2008 | Seeley et al. | |
| 7,440,554 B2 | 10/2008 | Elliot et al. | |
| 7,542,721 B1 | 6/2009 | Bonner et al. | |
| 7,558,379 B2 | 7/2009 | Winick | |
| 7,593,512 B2 | 9/2009 | Elliot et al. | |
| 7,593,513 B2 | 9/2009 | Muller | |
| 7,613,278 B2 | 11/2009 | Elliot et al. | |
| 7,619,512 B2 | 11/2009 | Trundle | |
| 7,633,385 B2 | 12/2009 | Cohn et al. | |
| 7,653,186 B2 | 1/2010 | Hosain et al. | |
| 7,734,020 B2 | 6/2010 | Elliot et al. | |
| 7,751,540 B2 | 7/2010 | Whitfield et al. | |
| 7,778,394 B2 | 8/2010 | Small et al. | |
| 7,820,841 B2 | 10/2010 | Van Toor et al. | |
| 7,848,505 B2 | 12/2010 | Martin et al. | |
| 7,853,199 B2 * | 12/2010 | Blum | 379/45 |
| 7,853,200 B2 | 12/2010 | Blum et al. | |
| 7,855,635 B2 | 12/2010 | Cohn et al. | |
| 7,911,341 B2 | 3/2011 | Raji et al. | |
| 7,920,841 B2 | 4/2011 | Martin et al. | |
| 7,920,842 B2 | 4/2011 | Martin et al. | |
| 7,920,843 B2 | 4/2011 | Martin et al. | |
| 7,961,088 B2 | 6/2011 | Watts et al. | |
| 8,022,807 B2 | 9/2011 | Martin et al. | |
| 8,073,931 B2 | 12/2011 | Dawes et al. | |
| 8,214,494 B1 | 7/2012 | Slavin | |
| 8,335,842 B2 | 12/2012 | Raji et al. | |
| 8,350,694 B1 | 1/2013 | Trundle et al. | |
| 8,456,293 B1 | 6/2013 | Trundle et al. | |
| 8,473,619 B2 | 6/2013 | Baum et al. | |
| 8,478,844 B2 | 7/2013 | Baum et al. | |
| 8,493,202 B1 | 7/2013 | Trundle et al. | |
| 8,520,072 B1 | 8/2013 | Slavin et al. | |
| 8,525,665 B1 | 9/2013 | Trundle et al. | |
| 8,705,704 B2 * | 4/2014 | Smith et al. | 379/45 |
| 8,798,260 B2 * | 8/2014 | Smith et al. | 379/455 |
| 2002/0103898 A1 | 8/2002 | Moyer | |
| 2002/0147982 A1 | 10/2002 | Naidoo et al. | |
| 2002/0176581 A1 | 11/2002 | Bilgic | |
| 2002/0177428 A1 | 11/2002 | Menard et al. | |
| 2003/0071724 A1 | 4/2003 | D'Amico | |
| 2004/0005044 A1 | 1/2004 | Yeh | |
| 2004/0086088 A1 | 5/2004 | Naidoo | |
| 2004/0086093 A1 | 5/2004 | Schranz | |
| 2005/0099893 A1 | 5/2005 | Jyrinki | |
| 2006/0176167 A1 | 8/2006 | Dohrmann | |
| 2006/0239250 A1 | 10/2006 | Elliot et al. | |
| 2007/0115930 A1 | 5/2007 | Reynolds et al. | |
| 2007/0143838 A1 | 6/2007 | Milligan | |
| 2007/0155412 A1 | 7/2007 | Kalsukis | |
| 2008/0084291 A1 | 4/2008 | Campion, Jr. | |
| 2008/0117029 A1 | 5/2008 | Dohrmann et al. | |
| 2008/0191863 A1 | 8/2008 | Boling | |
| 2009/0017757 A1 | 1/2009 | Koga | |
| 2009/0094491 A1 * | 4/2009 | Sharma et al. | 714/57 |
| 2009/0213999 A1 | 8/2009 | Farrand | |
| 2009/0248967 A1 | 10/2009 | Sharma | |
| 2009/0274104 A1 | 11/2009 | Addy | |
| 2010/0007488 A1 | 1/2010 | Sharma et al. | |
| 2010/0052890 A1 | 3/2010 | Trundle | |
| 2010/0121948 A1 | 5/2010 | Procopio | |
| 2010/0174560 A1 * | 7/2010 | Quan et al. | 379/39 |
| 2010/0277271 A1 | 11/2010 | Elliot et al. | |
| 2010/0289643 A1 | 11/2010 | Trundle | |
| 2010/0289644 A1 | 11/2010 | Slavin | |
| 2011/0065414 A1 * | 3/2011 | Frenette et al. | 455/404.1 |
| 2011/0169628 A1 | 7/2011 | Elliot | |
| 2011/0319071 A1 | 12/2011 | Beppler et al. | |
| 2012/0027010 A1 | 2/2012 | Elliot et al. | |
| 2012/0139718 A1 | 6/2012 | Foisy et al. | |
| 2012/0250833 A1 | 10/2012 | Smith et al. | |
| 2012/0250834 A1 | 10/2012 | Smith | |
| 2012/0275588 A1 | 11/2012 | Gregory | |
| 2013/0194091 A1 | 8/2013 | Trundle | |
| 2013/0215266 A1 | 8/2013 | Trundle | |
| 2013/0234840 A1 | 9/2013 | Trundle | |

OTHER PUBLICATIONS

Supplementary European Search Report for European Patent Application No. 12777574.0, issued Oct. 9, 2014.
Supplementary European Search Report for European Patent Application No. 12768379.5, issued Feb. 5, 2015.

* cited by examiner

DELIVERY OF ALARM SYSTEM EVENT DATA AND AUDIO OVER HYBRID NETWORKS

CROSS-REFERENCE TO RELATED APPLICATION

This application is a continuation of U.S. patent application Ser. No. 13/413,333, filed Mar. 6, 2012, which claims the benefit of U.S. Provisional Application No. 61/471,558, filed Apr. 4, 2011. The entire contents of each of U.S. patent application Ser. No. 13/413,333 and U.S. Provisional Application No. 61/471,558 are hereby incorporated herein by reference.

TECHNICAL FIELD

The present invention generally relates to a system and method for efficient delivery of alarm system event data and audio over hybrid telecommunications networks. Audio call activity is minimized between an alarm system and a central alarm monitoring station, reducing costs as compared to conventional systems and methods.

BACKGROUND

Historically, security alarm systems have relied upon the Public Switched Telephone Network (PSTN) to connect an alarm system to a central alarm monitoring station, so that alarm event data may be communicated from the alarm system to the central alarm monitoring station. These conventional alarm systems are configured to place an audio-band voice call to the central alarm monitoring station and transmit alarm event data to the central alarm monitoring station using (DTMF) touch tone codes, for example. Alarm systems equipped with two-way voice or ambient sound listening functionality have relied upon the same PSTN connection to connect a two-way audio-band voice call between the alarm system and the central alarm monitoring station. In this manner, an agent at the central alarm monitoring station is able to listen to ambient sounds captured by microphones at the premises where the alarm system is installed via the audio-band voice call. Similarly, the voice of the agent is communicated via the audio-band voice call and amplified by speakers and associated circuitry of the alarm system.

Some alarm systems substitute wireless radio communications services, such as cellular radiotelephone service, for the PSTN. In these systems, both alarm event data and voice are communicated over a two-way audio-band voice channel between the alarm system and the central alarm monitoring system using the cellular radiotelephone service. Other alarm systems substitute Voice over IP (VoIP) communications services for the PSTN. These systems also communicate both alarm event data and voice over a two-way audio-band voice channel established using the VoIP service.

It is noted that, for conventional alarm systems equipped with two-way voice functionality, a two-way voice channel may be automatically and/or necessarily established upon the occurrence of every alarm event. That is, the voice channel is established by the alarm system regardless of the type of the alarm event or any other considerations. Especially for alarm systems that substitute cellular radiotelephone service for the PSTN, costs associated with establishing and maintaining the voice channel are high.

Further, while conventional alarm systems are configured to establish and maintain a voice channel upon the occurrence of every alarm event, flexibility is lost, because the necessity to establish and maintain the voice channel is not evaluated by any means. In some systems, a service provider of alarm system monitoring services may have no ability to modify the configuration of monitored alarm systems, for example, if subscribers desire to terminate two-way voice monitoring services for lower costs.

The present invention is directed to addressing the deficiencies of the above-discussed conventional systems and methods by efficiently delivering alarm system event data and audio over hybrid telecommunications networks.

SUMMARY OF THE INVENTION

Delivery of alarm system event data and audio over hybrid networks is described. In one embodiment, a method for delivery of alarm system event data and connecting a voice channel is described including detecting, by an alarm system, an alarm event, communicating, by the alarm system, alarm event data to a message processing gateway, the alarm event data being representative of the alarm event, evaluating, by the message processing gateway, service parameters of the alarm system and conditions of the alarm event data, forwarding, by the message processing gateway, the alarm event data and a voice channel code to a private branch telecommunications switch if certain service parameters of the alarm system and conditions of the alarm event data are met, and opening, by the private branch telecommunications switch, a voice channel between the private branch telecommunications switch and a central alarm monitoring station and communicating the alarm event data and the voice channel code to the central alarm monitoring station. In other aspects, the method further includes determining, by the private branch telecommunications switch, whether the voice channel between the private branch telecommunications switch and the central alarm monitoring station remains open after communication of the alarm event data and the voice channel code to the central alarm monitoring station, forwarding, by the private branch telecommunications switch, a routing code to the alarm system in response to a determination that the voice channel between the private branch telecommunications switch and the central alarm monitoring station remains open, opening, by the alarm system, a voice channel between the alarm system and the private branch telecommunications switch in response to a receipt of the routing code, and bridging, by the private branch telecommunications switch, the voice channel between the private branch telecommunications switch and the central alarm monitoring station and the voice channel between the alarm system and the private branch telecommunications switch, to create a voice channel between the alarm system and the central alarm monitoring station.

In additional aspects, evaluating service parameters of the alarm system and the alarm event data comprises at least one of determining whether an IP address associated with the alarm system or an ID of the alarm system is provisioned at the message processing gateway, determining whether the alarm system is associated with an active customer account, determining whether the alarm system is capable and configured for a two-way voice channel, and determining whether an alarm event associated with the alarm event data requires a voice channel.

In other aspects, forwarding the alarm event data and the voice channel code further includes forwarding the alarm event data and the voice channel code to the private branch telecommunications switch when it is determined that the alarm event associated with the alarm event data requires a voice channel. Further, communicating the alarm event data to the message processing gateway comprises communicating an identifier of the alarm system to the message processing gateway, the routing code comprises a routing number of the private branch telecommunications exchange and the identifier of the alarm system, and bridging the voice channels comprises bridging the voice channels based on the identifier of the alarm system.

In still other aspects, the method further includes determining, by the private branch telecommunications switch, whether the voice channel between the private branch telecommunications switch and the central alarm monitoring station remains open, after the voice channel between the alarm system and the private branch telecommunications switch is opened by the alarm system in response to a receipt of the routing code, and indicating, by the private branch telecom switch, that the voice channel between the private branch telecommunications switch and the central alarm monitoring station is disconnected, when it is determined by the private branch telecom switch that the voice channel between the private branch telecommunications switch and the central alarm monitoring station is disconnected. Additionally, the method further includes communicating, by the message processing gateway, the alarm event data to the central alarm monitoring system if the certain service parameters of the alarm system and the alarm event data are not met.

In another embodiment a system for delivery of alarm system event data and connecting a voice channel is described including an alarm system configured to detect an alarm event, and communicate alarm event data representative of the alarm event, a message processing gateway configured to receive the alarm event data from the alarm system, evaluate service parameters of the alarm system and conditions of the alarm event data, and forward the alarm event data and a voice channel code if certain service parameters of the alarm system and conditions of the alarm event data are met, and a private branch telecommunications switch configured to open a voice channel between the private branch telecommunications switch and a central alarm monitoring station and communicate the alarm event data and the voice channel code to the central alarm monitoring station, determine whether the voice channel between the private branch telecommunications switch and the central alarm monitoring station remains open after communication of the alarm event data and the voice channel code to the central alarm monitoring station, and forward a routing code to the alarm system in response to a determination that the voice channel between the private branch telecommunications switch and the central alarm monitoring station remains open.

In additional aspects, the alarm system is further configured to open a voice channel between the alarm system and the private branch telecommunications switch in response to a receipt of the routing code, and the private branch telecommunications switch is further configured to bridge the voice channel between the private branch telecommunications switch and the central alarm monitoring station and the voice channel between the alarm system and the private branch telecommunications switch, to create a voice channel between the alarm system and the central alarm monitoring station. The message processing gateway is further configured to determine whether an IP address associated with the alarm system or an ID of the alarm system is provisioned at the message processing gateway, determine whether the alarm system is associated with an active customer account, determine whether the alarm system is capable and configured for a two-way voice channel, and determine whether an alarm event associated with the alarm event data requires a voice channel. The message processing gateway is further configured to forward the alarm event data and the voice channel code to the private branch telecommunications switch when it is determined that the alarm event data requires a voice channel.

In other aspects, the alarm system is further configured to communicate an identifier of the alarm system to the message processing gateway, and the routing code comprises a routing number of the private branch telecommunications exchange and the identifier of the alarm system. Further, the private branch telecommunications switch is configured to bridge the voice channel between the private branch telecommunications switch and the central alarm monitoring station and the voice channel between the alarm system and the private branch telecommunications switch based on the identifier of the alarm system. In another aspect, the private branch telecommunications switch is further configured to determine whether the voice channel between the private branch telecommunications switch and the central alarm monitoring station remains open, after the voice channel between the alarm system and the private branch telecommunications switch is opened by the alarm system in response to a receipt of the routing code, and indicate that the voice channel between the private branch telecommunications switch and the central alarm monitoring station is disconnected, when it is determined that the voice channel between the private branch telecommunications switch and the central alarm monitoring station is disconnected. Further, the message processing gateway is configured to communicate the alarm event data to the central alarm monitoring system if the certain service parameters of the alarm system and the alarm event data are not met.

In another embodiment, a method for delivery of alarm system event data and connecting a voice channel is described including receiving alarm event data representative of an alarm event from an alarm system, evaluating, by a computing device, service parameters of the alarm system and conditions of the alarm event data, opening a voice channel between the computing device and a central alarm monitoring station and communicating the alarm event data and a voice channel code to the central alarm monitoring station if certain service parameters of the alarm system and conditions of the alarm event data are met, determining, by the computing device, whether the voice channel between the computing device and the central alarm monitoring station remains open after communication of the alarm event data and the voice channel code to the central alarm monitoring station, generating and forwarding, by the computing device, a routing code to the alarm system in response to a determination that the voice channel between the computing device and the central alarm monitoring station remains open, opening a voice channel between the alarm system and computing device after forwarding the routing code to the alarm system, and bridging, by the computing device, the voice channel between the computing device and the central alarm monitoring station and the voice channel between the alarm system and the computing device, to create a voice channel between the alarm system and the central alarm monitoring station.

In still another embodiment an apparatus for delivery of alarm system event data and connecting a voice channel is described including a message processing gateway configured to receive alarm event data representative of an alarm event from an alarm system, evaluate service parameters of the alarm system and conditions of the alarm event data, and forward the alarm event data and a voice channel code if certain service parameters of the alarm system and conditions of the alarm event data are met, and a private branch telecommunications switch configured to receive the alarm event data and the voice channel code, open a voice channel between the private branch telecommunications switch and a central alarm monitoring station and communicate the alarm event data and the voice channel code to the central alarm monitoring station, determine whether the voice channel between the private branch telecommunications switch and the central alarm monitoring station remains open after communication of the alarm event data and the voice channel code to the central alarm monitoring station, generate and forward a routing code to the alarm system in response to a determination that the voice channel between the private branch telecommunications switch and the central alarm monitoring station remains open, open a voice channel between the alarm system and the private branch telecommunications switch after forwarding the routing code to the alarm system, and bridge the voice channel between the private branch telecommunications switch and the central alarm monitoring station and the voice channel between the alarm system and the private branch telecommunications switch, to create a voice channel between the alarm system and the central alarm monitoring station.

These and other aspects, objects, features, and embodiments will become apparent to a person of ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the invention and the advantages thereof, reference is now made to the following description, in conjunction with the accompanying figures briefly described as follows.

DETAILED DESCRIPTION

In the following paragraphs, the present invention will be described in further detail by way of example with reference to the attached drawings. In the description, well known components, methods, and/or processing techniques are omitted or briefly described so as not to obscure the invention. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

Turning now to the drawings, in which like numerals indicate like elements throughout, exemplary embodiments of the invention are described in detail.

Figure 1:
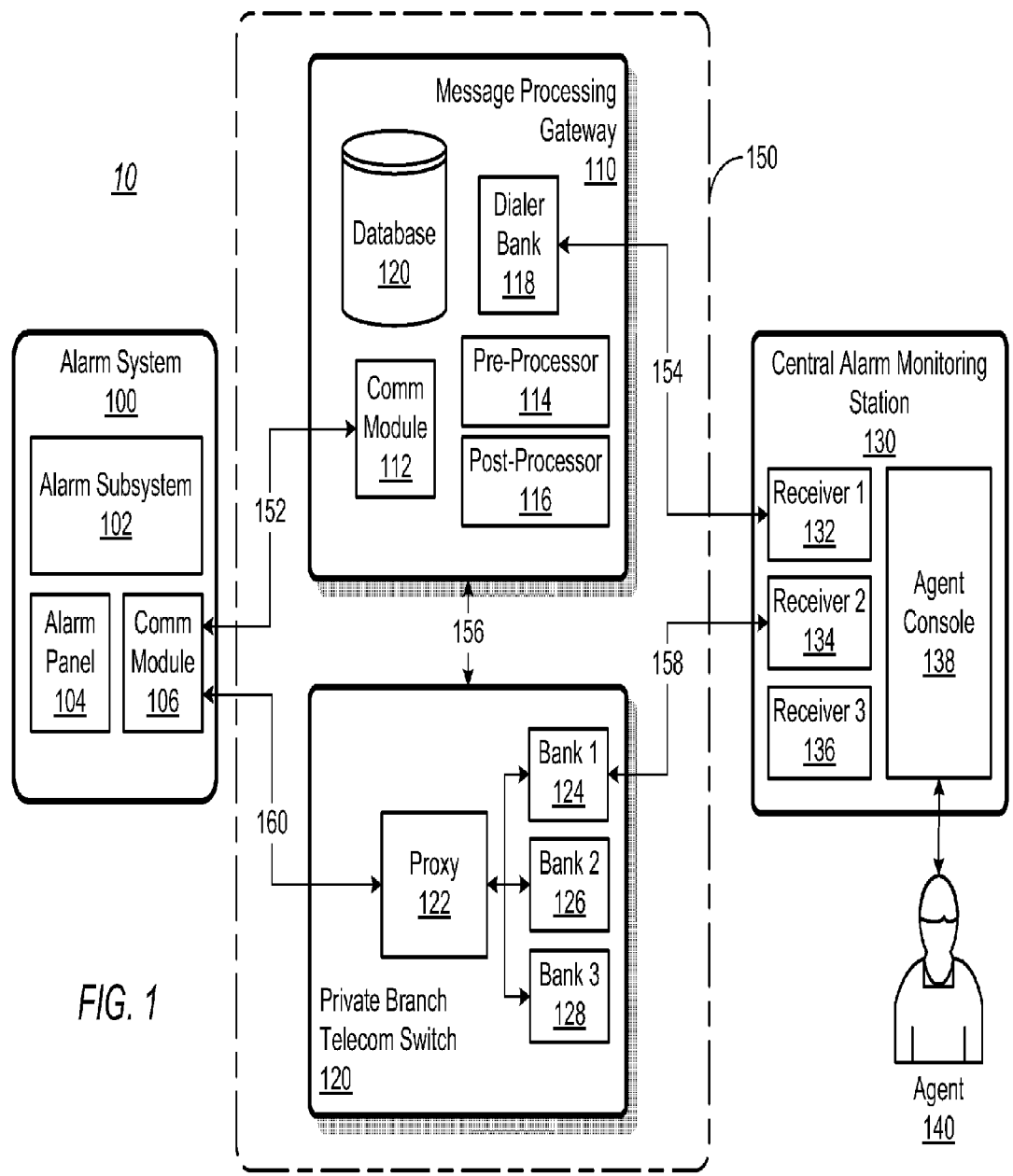
FIG. 1 illustrates a system for efficient delivery of alarm system event data and audio over hybrid networks.

FIG. 1 illustrates an exemplary system 10 for efficient delivery of alarm system event data and audio over hybrid networks. As illustrated, the system 10 includes an alarm system 100, a message processing gateway 110, a private branch telecommunications switch 120, and a central alarm monitoring station 130. The alarm system 100 comprises an alarm subsystem 102, an alarm panel 104, and a communications module 106. The alarm subsystem 102 includes one or more sensors for detecting various types of alarm events, such as fire, burglary, or medical emergency. As a non-limiting example subset of sensors for detecting fires and burglaries, the alarm subsystem 102 may include wired and/or wireless magnetic window and door sensors, glass-break sensors, infra-red sensors, motion sensors, smoke detectors, and carbon monoxide sensors. The alarm subsystem 102 may further comprise one or more sirens, speakers, and microphones for sounding an alarm, capturing sounds within a premises at which the alarm system 100 is installed, and amplifying a voice of an agent as described in further detail below. The alarm panel 104 comprises a display illustrating a current status of the alarm system 100 and a keypad including buttons and/or other controls to configure the alarm system 100, for example. A user of the alarm system 100 is able to determine a current status of the alarm system 100 by viewing the display of the alarm panel 104. The user is also able to call for fire, police, and medical emergency personnel using the keypad of the alarm panel 104. The alarm system 100 further comprises other wiring and associated circuitry necessary for alarm systems as understood in the art. The alarm system 100 may be installed at any location including a home or office building.

The communications module 106 comprises circuitry and associated firmware and/or software for establishing data and voice channels with other communications modules. Particularly, the communications module 106 is configured to establish data and voice channels with other communications modules using industry standard communications protocols and communications links. In various embodiments, the communications module 106 comprises circuitry and associated firmware and/or software layers to communicate over wired and/or wireless networks such as twisted pair telephone lines, computer network cables, coaxial cables, WiFi, WiMAX, satellite, and cellular communications networks. In various embodiments, the communications module 106 is configured to communicate over industry standard cellular communications networks such as Global System for Mobile Communications ("GSM") networks, Code Division Multiple Access ("CDMA") spread spectrum networks, Long Term Evolution (LTE) networks, and mobile WiMAX networks, for example. Thus, the communications module 106 may be configured to establish data and voice channels over the Public Switched Telephone Network ("PSTN"), Voice over IP ("VoIP") communications links, and wireless cellular communications links The communications module 106 may be further configured to communicate data using various signaling techniques and packet-based protocols such as Dual-Tone Multi-frequency ("DTMF") signaling, Transmission Control Protocol ("TCP"), and User Datagram Protocol ("UDP"), for example. In one embodiment, the communications module 106 communicates data using a packet-based mobile data service such as General Packet Radio Service ("GPRS"), for example. It is noted that, especially for cellular communications networks, the cost of communicating data over a data channel may vary as compared to the cost of communicating voice over a voice channel, because the resources required for communicating data in discrete amounts is generally lower than the resources required to open and maintain a voice channel.

In operational aspects, the alarm system 100 is configured to detect an alarm event using one or more of the sensors of the alarm subsystem 102 or the alarm panel 104, and communicate associated alarm event data to the message processing gateway 110 using a data channel established between the alarm system 100 and the message processing gateway 110. In one embodiment, the alarm system 100 may communicate alarm event data in the alarm industry standard Contact ID format. Accordingly, the alarm system 100 may communicate the Contact ID event codes "100," "120," or "130" for fire, panic, and burglary alarms, respectively, as understood in the art. According to additional aspects, the alarm system 100 is also configured to open a voice channel between the alarm system 100 and the private branch telecommunications switch 120 in response to a receipt of a routing code after transmission of the alarm event data, as described in further detail below.

The message processing gateway 110 comprises, but is not limited to, a communications module 112, a pre-processor 114, a post-processor 116, a dialer bank 118, and a database 120. The communications module 112 is configured to communicate over one or more types of communications networks and is similar to the communications module 106. Particularly, the communications module 112 is configured to establish data and voice channels with the communications module 106 via the communications link 152, which may comprise one or more wired or wireless communications links. The pre-processor 114 is configured to perform overhead functions of outbound network communications such as encoding and packetizing data. The post-processor 116 is configured to decode and process data received by the communications module 112. In one embodiment, the dialer bank 118 is configured to establish a voice channel call to the central alarm monitoring station 130 via the communications link 154, which may comprise one or more wired or wireless communications links including the PSTN. The dialer bank 118 may be further configured to communicate data, including alarm event data received from the alarm system 100, to the central alarm monitoring station 130 using DTMF signaling over the voice channel.

The database 120 comprises one or more computer-readable storage devices that store computer-executable program code as well as data related to alarm systems, accounts of alarm monitoring subscribers, alarm system event data, and other associated data. For example, the database 120 may store data associated with a plurality of alarm monitoring subscriber accounts for billing and other purposes. The account data and other associated information stored in the database 120 may be maintained and updated via a network interface by account owners such as alarm services dealers. The alarm system event data may be maintained and updated by the post-processor 116. It is noted that the message processing gateway 110 provides and facilitates alarm monitoring services for a plurality of alarm systems in addition to the alarm system 100. As such, the database 120 stores data related to a plurality of alarm systems in addition to the alarm system 100.

In operational aspects, the message processing gateway 110 is configured to receive alarm event data representative of an alarm event from the alarm system 100, evaluate service parameters of the alarm system 100 and the alarm event data, and forward the alarm event data along with associated information to the private branch telecommunications switch 120 if certain service parameters of the alarm system and the alarm event data are met. A more detailed description of the processes of the message processing gateway 100 are provided below.

The private branch telecommunications switch 120 comprises one or more proxies 122 and at least one bank of communications modules. Particularly, the private branch telecommunications switch 120, as illustrated, includes three communications banks 124, 126, and 128. The private branch telecommunications switch 120 may comprise additional or fewer communications banks among embodiments. In one embodiment, the message processing gateway 110 and the private branch telecommunications switch 120 comprise separate computing devices, and the private branch telecommunications switch 120 is communicatively coupled to the message processing gateway 110 via the communications link 156. The communications link 156 may comprise one or more wired or wireless communications links. The private branch telecommunications switch 120 and the message processing gateway 110 may communicate using Application Programming Interface ("API") web services over the Internet or other public and/or private networks. In other embodiments, the private branch telecommunications switch 120 and the message processing gateway 110 may be integrated into a single computing device, as designated by the hashed outline 150.

The communications banks 124, 126, and 128 are configured to establish a voice channel to the central alarm monitoring station 130 over the communications link 158, which may comprise one or more wired or wireless communications links including the PSTN. It is noted that the communications link 158 may comprise communications links other than the PSTN, such as the Internet. As compared to the dialer bank 118, the communications banks 124, 126, and 128 may comprise additional circuitry, firmware, and/or software to facilitate two-way voice communications over the voice channel established between the private branch telecommunications switch 120 and the central alarm monitoring station 130. For example, the dialer bank 118 may comprise circuitry for establishing a voice channel and communicating data using the limited number of DTMF tones but not circuitry for facilitating a two-way audio-band voice conversation between individuals.

In operational aspects, the private branch telecommunications switch 120 is configured to open a voice channel to the central alarm monitoring station 130 and communicate the alarm event data and associated information received from the message processing gateway 120 to the central alarm monitoring station 130. In additional aspects, the private branch telecommunications switch 120 is further configured to determine whether the voice channel between the private branch telecommunications switch 120 and the central alarm monitoring station 130 remains open after the alarm event data and associated information is communicated to the central alarm monitoring station 130. The private branch telecommunications switch 120 is further configured to generate and forward a routing code to the alarm system 100 in response to a determination that the voice channel between the private branch telecommunications switch 120 and the central alarm monitoring station 130 remains open and bridge a voice channel between the alarm system 100 and the central alarm monitoring station 130.

The central alarm monitoring station 130 comprises at least one agent console 138 and a plurality of receiver modules 132, 134, and 136. The central alarm monitoring station is staffed by personnel including agent 140. As illustrated in FIG. 1, the agent 140 is able to view the agent console 138, which displays information associated with received alarm event data from alarm systems. For example, after receiving alarm event data and associated information from the alarm system 100 and the message processing gateway 110, the agent console 138 may display details related to an alarm event occurring at a location where the alarm system 100 is installed. For example, based on alarm event data received from the alarm system 100, the agent console 138 may indicate that a fire, panic, burglary, or medical emergency is occurring at a home or office where the alarm system 100 is installed. Additionally, the agent console 138 may display a street address or geographic coordinates of the home or office with contact information for fire, police, and medical services. Based on the display, the agent 140 is able to assess the event where the alarm system 100 is installed. Generally, the central alarm monitoring station 130 facilitates monitoring alarm systems installed at a plurality of locations by one or more agents that assess alarm events and, sometimes, contact service personnel based upon alarm event data received from the alarm systems. For example, the agents monitoring alarm systems at the central alarm monitoring station 130 may call for fire, police, or medical service personnel to be dispatched based on alarm event data received from a plurality of monitored alarm systems.

When an alarm system includes two-way voice functionality, a voice channel may be established between the alarm system and the central alarm monitoring station 130. As such, the agent 140 at the central alarm monitoring station 130 is able to listen to ambient sounds captured by microphones of an alarm system, for example, at a location where the alarm system is installed. The sounds may be communicated over a voice channel established between the alarm system and the central alarm monitoring station 130. The agent is also able to speak into a handset or headset microphone, for example, at the central alarm monitoring station 130, and the agent's voice may be communicated over the voice channel and amplified over speakers at the location where the alarm system is installed. As described herein, an alarm system comprising "two-way voice functionality" is capable of establishing a full-duplex voice-band audio link between the alarm system and an alarm monitoring station. Using the two-way voice functionality, the agent 140 is able to assess any ambient sounds captured at a location where an alarm system is installed in connection with received alarm event data. For example, the agent 140 may be able to hear one or more persons committing a crime in connection with alarm event data indicating a burglary event and warn those persons that police have been dispatched. In another example, the agent may be able to hear an individual's request for medical assistance.

As compared to conventional alarm systems, the exemplary system 10 of the present invention is configured to establish a voice channel using a method that reduces an amount of time the two-way voice channel is established and maintained between the alarm system 100 and the central alarm monitoring station 130. Further, the exemplary system 10 is configured to establish the voice channel only if certain service parameters of the alarm system and conditions of the alarm event data are met.

As described in further detail below, when an alarm event is detected, the alarm system 100 is configured to establish a data connection to the message processing gateway 110 using the communications module 106 and communicate alarm event data to the message processing gateway 110 before a voice channel is established. In turn, the message processing gateway 110 is configured to forward the alarm event data to the central alarm monitoring station 130 via the private branch telecommunications switch 120 if certain service parameters of the alarm system 100 and the alarm event data are met—before the voice channel is established. The voice channel is established at a later time after the alarm system 100 receives a routing code from the private branch telecommunications switch 120, as described in further detail below with reference to FIGS. 2-5.

Before turning to the process flow diagrams of FIGS. 2-5, it is noted that the present invention may be practiced using an alternative order of the steps illustrated in FIGS. 2-5. That is, the process flows illustrated in FIGS. 2-5 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention. In alternative embodiments, steps may be performed in different orders, in parallel with one another, or omitted entirely, and/or certain additional steps may be performed without departing from the scope and spirit of the invention.

Figure 2:
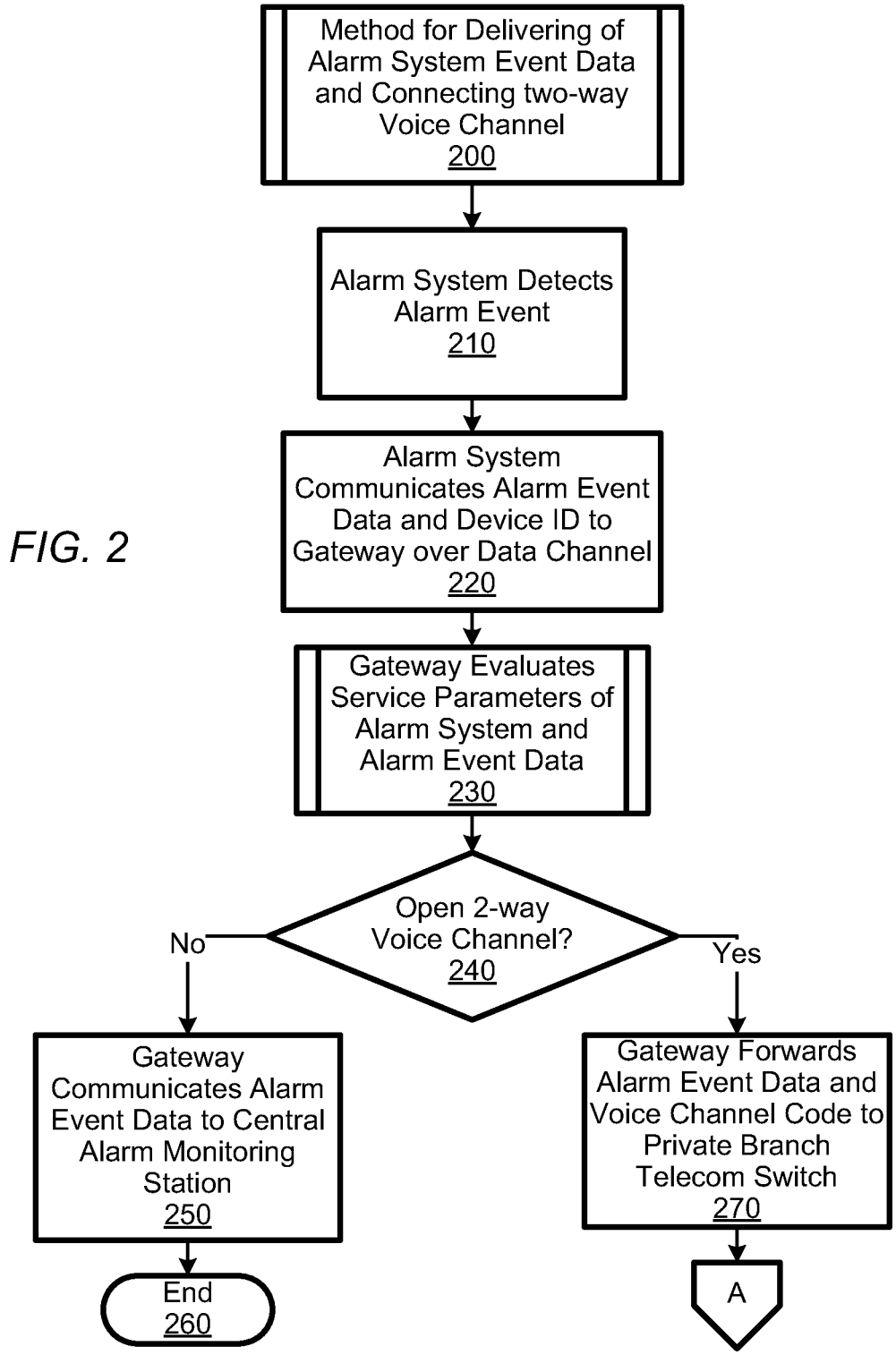
FIG. 2 illustrates a process flow diagram of a method for delivering alarm system event data and connecting a two-way voice channel.

Turning to FIG. 2, a method 200 for delivering alarm system event data and connecting a two-way voice channel is illustrated. At step 210, the alarm system 100 detects an alarm event. For example, the alarm system 100 may detect a fire, burglary, or medical emergency using one or more of the sensors of the alarm subsystem 102 or according to a button pressed on the keypad of the alarm panel 104. In other words, the alarm event may be responsive to the sensors of the alarm system 102 or an individual's request for attention using the alarm panel 104. At step 220, the alarm system 100 communicates alarm event data associated with the detected alarm event to the message processing gateway 110 using a data channel established by the communications module 106. For example, the alarm system 100 may communicate the alarm event data as one or more packets of data using a data communications protocol over the communications channel 152 without relying on the establishment of a voice channel. In one embodiment, the alarm event data is formatted in the industry standard Contact ID format. The alarm system 100 may also communicate information in addition to the alarm event data, such as a device ID of the alarm system 100. The device ID may be a serial number of the alarm system 100, a serial number of the communications module 106, an IP address assigned to the communications module 106, or other unique identification data associated with the alarm system 100.

At step 230, the message processing gateway 110 evaluates service parameters of the alarm system 100 and the data received from the alarm system 100. Based on the evaluation at step 230, the message processing gateway 110 determines whether to open a two-way voice channel at step 240. As described in further detail below with reference to FIG. 5, the message processing gateway 110 evaluates service parameters of the alarm system 100 and the data received from the alarm system 100 to determine whether the alarm system 100 and the central alarm monitoring station 130 are to be connected via a two-way voice channel. For example, the message processing gateway 110 determines whether to open the voice channel based on whether certain service parameters of the alarm system 100 and conditions of the data received from the alarm system 100 are met. The parameters of the alarm system and conditions of the data may be determined with reference to data stored in the database 120, as described in further detail below.

If the message processing gateway 110 determines that a voice channel is not to be opened between the alarm system 100 and the central alarm monitoring station 130 at step 240, the message processing gateway 110 proceeds to step 250 and communicates the alarm event data received from the alarm system 100 to the central alarm monitoring station 130 via the communications link 154. That is, the message processing gateway 110 establishes a communications channel to the central alarm monitoring station 130 via communications link 154 using the dialer bank 188 and the receiver module 132. After establishing the communications channel, the message processing gateway 110 communicates the alarm event data received from the alarm system 100 to the central alarm monitoring station 130 using DTMF tones, for example. It is noted that the message processing gateway 110 may communicate data to the central alarm monitoring system 130 in addition to the alarm event data. For example, the message processing gateway 110, when evaluating the service parameters of the alarm system 100 at step 230, may query the database 120 to gather account data associated with the alarm system 100 such as associated phone number(s) of central alarm monitoring station(s), account numbers, billing information, subscriber names, serial numbers, and IP addresses of the alarm system 100. In turn, the message processing gateway 110 may communicate one or more of these additional data items, such as account number(s), to the central alarm monitoring station 130 when communicating the alarm event data.

Based on the alarm event data and any other associated information received from the message processing gateway 110, the agent console 138 is updated with a display of the alarm event detected by the alarm system 100, and the process ends at step 260 after the central alarm monitoring station 130 has received the alarm event data. In this case, according to the evaluation of the service parameters of the alarm system 100 and conditions of the data received from the alarm system 100 at step 230, no voice channel is connected between the alarm system 100 and the central alarm monitoring system 130. As such, the agent 140 determines whether to contact emergency personnel such as police, fire, or medical personnel based on the updated display of the agent console 138 without the additional benefit of the voice channel. The agent 140 may alternatively or additionally determine whether to contact service personnel, for example, if the event data indicates a building system failure.

On the other hand, if the message processing gateway 110 determines that a voice channel is to be opened between the alarm system 100 and the central alarm monitoring station 130 at step 240, the message processing gateway 110 proceeds to step 270 and forwards the alarm event data received from the alarm system 100 to the central alarm monitoring station 130 via the communications link 156. In other words, the message processing gateway 110 establishes a communications channel to the private branch telecommunications switch 120 via the communications link 156 using a web services API link over the Internet, for example. After establishing the communications channel, the message processing gateway 110 communicates the alarm event data received from the alarm system 100 to the private branch telecommunications switch 120. It is noted that, among embodiments, the message processing gateway 110 may communicate the alarm event data to the private branch telecommunications switch 120 using communications channels and/or protocols other than the web-services API link. Also, the message processing gateway 110 may forward data to the private branch telecommunications switch 120 in addition to the alarm event data. For example, the message processing gateway 110, when evaluating the parameters and data of the alarm system 100 at step 230, may query the database 120 to gather account data associated with the alarm system 100, such as phone and/or account numbers, billing information, subscriber names, serial numbers, and IP addresses of the alarm system 100. In turn, the message processing gateway 110 may forward one or more of these additional data items to the private branch telecommunications switch 120.

In one aspect, as compared to when the message processing gateway 110 communicates the alarm event data to the central alarm monitoring station 130 via the communications link 154, the message processing gateway 110 also forwards a voice channel code to the private branch telecommunications switch 120 when forwarding the alarm event data via the communications link 156. Particularly, in one embodiment, the voice channel code is inserted among data forwarded to the private branch telecommunications switch 120 so that the voice channel code may be communicated to the central alarm monitoring station 130 by the private branch telecommunications switch 120. As described herein, the voice channel code comprises a code recognized by the central alarm monitoring station 130 as a command to maintain an open voice channel. As described in further detail below, the central alarm monitoring station 130 maintains the open voice channel so that a two-way voice channel may be established between the alarm system 100 and the central alarm monitoring station 130. In other words, the voice channel code comprises a code which identifies to the central alarm monitoring station 130 that the alarm system 100 comprises two-way voice functionality and is requesting a two-way voice channel.

In another aspect, the message processing gateway 110 also forwards a routing number of the central alarm monitoring system 130 to the private branch telecommunications switch 120 when forwarding the alarm event data. The routing number of the central alarm monitoring system 130 may comprise a PSTN telephone number of one of the receiver modules 132, 134, and 136 or a Session Initiation Protocol ("SIP") address or IP address of the central alarm monitoring station 130, for example. The private branch telecommunications switch 120 may use the routing number to establish a communications channel with the central alarm monitoring station 130 via the communications link 158.

Figure 3:
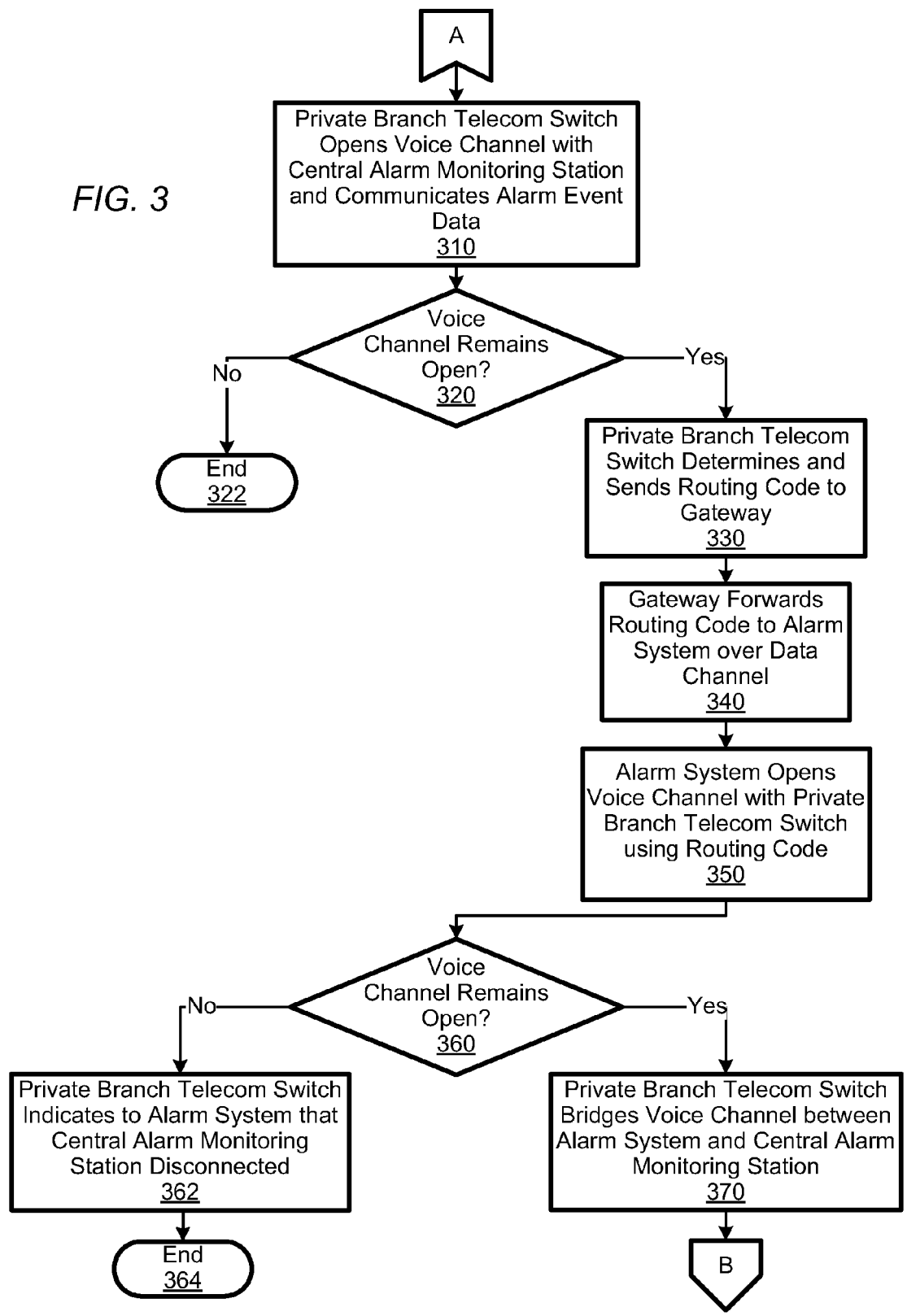
FIG. 3 further illustrates a process flow diagram of a method for delivering alarm system event data and connecting a two-way voice channel.
Figure 4:
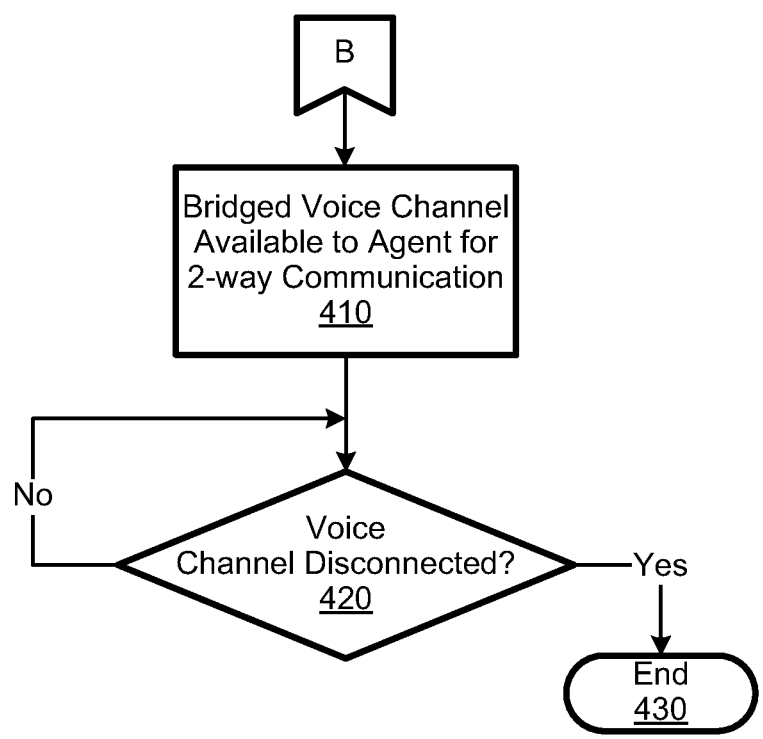
FIG. 4 further illustrates a process flow diagram of a method for delivering alarm system event data and connecting a two-way voice channel.

Turning to FIG. 3, at step 310, the telecommunications switch 120 opens a voice channel with a receiver module of the central alarm monitoring station 130 using the communications bank 124 via the communications link 158. The private branch telecommunications switch 120 may open the voice channel with reference to the routing number of the central alarm monitoring station 130 received from the message processing gateway 110, for example. After opening the voice channel, the private branch telecommunications switch 120 communicates the alarm event data and other associated information received from the message processing gateway 110 to the central alarm monitoring station 130. In one embodiment, the private branch telecommunications switch 120 communicates the alarm event data, an account number of the alarm system 100, and the voice channel code. Among embodiments, the private branch telecommunications switch 120 may communicate any portion or all of the data received from the message processing gateway 110 to the central alarm monitoring station 130.

At step 320, the private branch telecommunications switch 120 determines whether the voice channel between the private branch telecommunications switch 120 and the central alarm monitoring system 130 remains open after a kiss-off or other acknowledgement from the central alarm monitoring system 130. In other words, the private branch telecommunications switch 120 determines whether the central alarm monitoring station 130 has maintained an open communications channel via the communications link 158 after the central alarm monitoring station 130 acknowledges receipt of the alarm event data and other associated information from the private branch telecommunications switch 120.

If the private branch telecommunications switch 120 determines at step 320 that the voice channel does not remain open after communication of the alarm event data to the central alarm monitoring station 130, the process ends at step 322. In alternative embodiments, the private branch telecommunications switch 120 may indicate to the message processing gateway 110 that the central alarm monitoring station 130 disconnected the voice communications channel before the process ends at step 322.

Alternatively, if the private branch telecommunications switch 120 determines at step 320 that the central alarm monitoring station 130 maintains an open voice channel after receipt of the alarm event data, the process proceeds to step 330 where the private branch telecommunications switch 120 generates and sends a routing code to the message processing gateway 110. The routing code may be determined based upon a routing address of the private branch telecommunications switch 120, an ID of the alarm system 100, and the particular one of the communications modules 124, 126, and 128 used to open the voice channel to the central alarm monitoring station 130, for example. The routing code is used by the alarm system 100 to establish a voice channel between the alarm system 100 and the private branch telecommunications switch 120.

At step 340, the message processing gateway 110 forwards the routing code to the alarm system 100 via the communications link 152. The message processing gateway 110 forwards the routing code to the alarm system 100 using a data channel between the message processing gateway 110 and the alarm system 100. Proceeding to step 350, after the alarm system 100 receives the routing code from the private branch telecommunications switch 120, the alarm system 100 opens a voice channel to the private branch telecommunications switch 120 with reference to the routing code. Particularly, the alarm system 100 uses the communications module 106 to open a voice channel to the private branch telecommunications switch 120 via the communications link 160. In one embodiment, the routing code comprises a telephone number of the private branch telecommunications switch 120 and an ID of the alarm system 100. In another embodiment, the routing code may also include an identification number that identifies the bank of communications modules that maintains the open voice channel between the private branch telecommunications switch 120 and the central alarm monitoring station 130.

At step 360, the private branch telecommunications switch 120 determines whether the voice channel remains open between the private branch telecommunications switch 120 and the central alarm monitoring station 130. If the private branch telecommunications switch 120 determines that the voice channel is no longer open at step 360, the private branch telecommunications switch 120 indicates to the alarm system 100 that the central alarm monitoring station 130 has disconnected at step 362. As one indication that the central alarm monitoring station 130 has disconnected, the private branch telecommunications switch 120 may provide a busy signal to the alarm system 100, indicating that the central alarm monitoring station 130 is unavailable.

If the private branch telecommunications switch 120 determines at step 360 that the voice channel remains open between the private branch telecommunications switch 120 and the central alarm monitoring station 130, the private branch telecommunications switch 120 bridges the voice channel established between the alarm system 100 and the private branch telecommunications switch 120 with the voice channel established between the private branch telecommunications switch 120 and the central alarm monitoring station 130. Thus, a voice channel between the alarm system 100 and the central alarm monitoring station 130 is created. After the voice channel is bridged between the alarm system 100 and the central alarm monitoring station 130, the agent 140 is able to speak into a headset or handset microphone at the central alarm monitoring station 130 and the agent's voice may be amplified over the speakers of the alarm system 100. Additionally, the agent 140 is able to listen for sounds at a location where the alarm system 100 is installed using a microphone of the alarm system 100. The bridged voice channel continues until it is disconnected at step 420. The process ends at step 430 when the bridged voice channel is disconnected.

It is noted that, for some time after the central alarm monitoring station 130 receives data from the private branch telecommunications switch 120 at step 310, the agent 140 may not be available to listen for ambient sounds captured by the alarm system 100 due to other priorities. By the time that the voice channel is bridged between the alarm system 100 and the central alarm monitoring station 130, however, the agent 140 is more likely to be available to listen for the ambient sounds. It is further noted that the exemplary system 10 helps to reduce costs associated with maintaining a voice channel between the alarm system 100 and the central alarm monitoring station 130 while the agent 140 is busy with other priorities.

Figure 5:
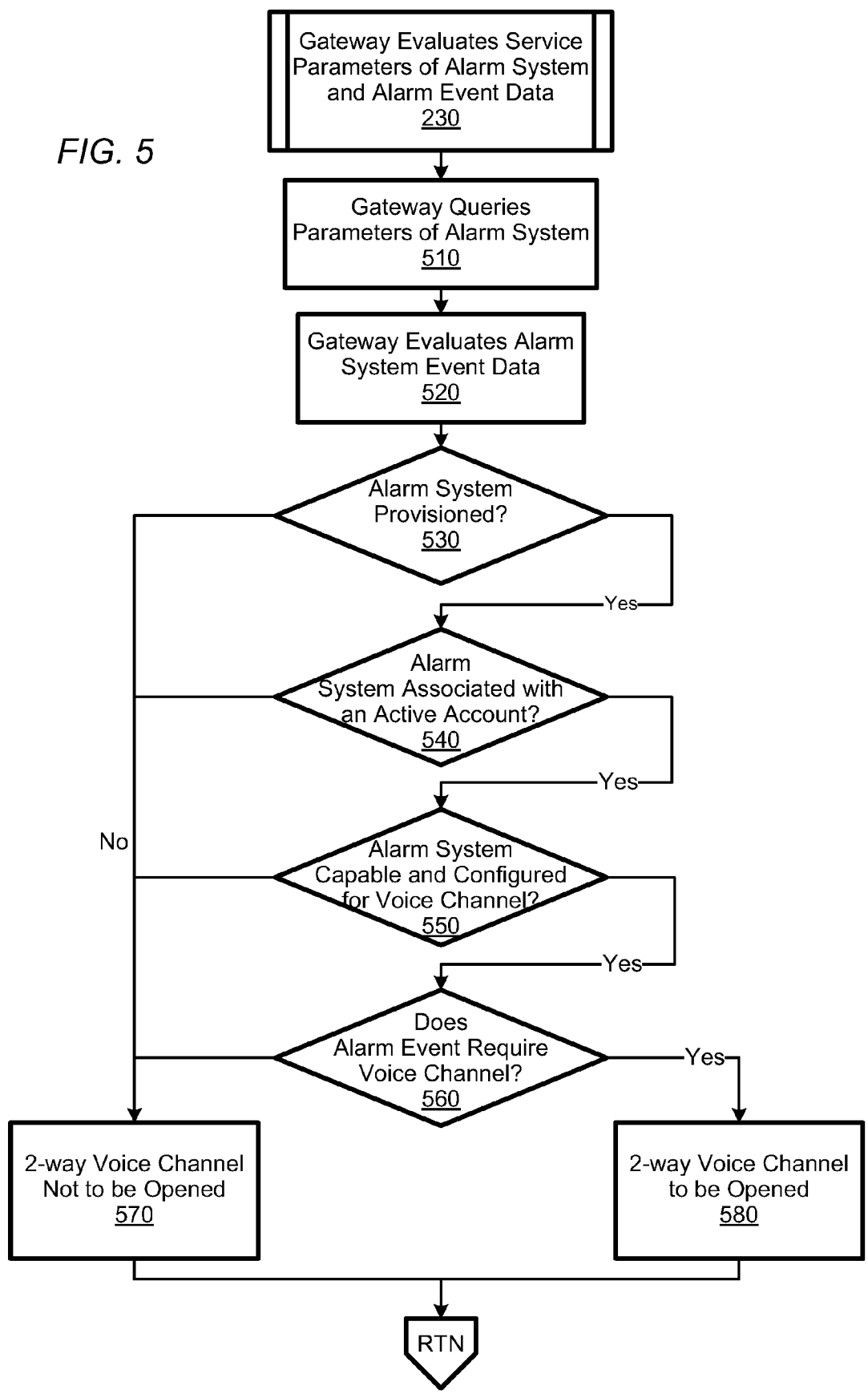
FIG. 5 illustrates a process flow diagram of a method for evaluating service parameters of an alarm system and alarm event data.

Turning to FIG. 5, an exemplary evaluation of the service parameters of the alarm system 100 and the alarm event data by the message processing gateway 110 is described in further detail. Generally, the evaluation is relied upon to determine whether a two-way voice channel is to be opened between the alarm system 100 and the central alarm monitoring station 130. The decision blocks in the evaluation illustrated in FIG. 5 are provided by way of example only, and embodiments may be implemented using fewer or additional factors, decisions, or considerations.

At step 510, the post-processor 116 of the message processing gateway 110 queries data associated with the alarm system 100 from the database 120. Particularly, the post-processor 116 of the message processing gateway 110 queries the database 120 for various types of data associated with the alarm system 100, such as account numbers, billing information, subscriber names, serial numbers, IP addresses, other service parameters of the alarm system 100. At step 520, the message processing gateway 110 evaluates the alarm system event data.

After the query at step 510 and the evaluation at step 520, the post-processor 116 determines whether a two-way voice channel is to be opened at decisions blocks 530, 540, 550, and 560. At step 530, the post-processor 116 determines whether the alarm system 100 is provisioned in the database 120. In other words, the post-processor 116 determines whether the alarm system 100 is registered among a known group of serviced alarm systems of the message processing gateway. To determine whether the alarm system 100 is registered, the post-processor 116 may reference an IP address or serial number of the alarm system 100 and cross-reference that information with information in the database 120. If the alarm system 100 is not among the known group of serviced alarm systems of the message processing gateway, the post-processor 116 proceeds to step 570 and it is determined that no two-way voice channel is to be opened. In this case, no voice channel is to be opened between the alarm system 100 and the central alarm monitoring system 130 because the alarm system 100 is not a provisioned customer of the system 10. Alternatively, if the alarm system 100 is among the known serviced alarm systems, the process proceeds to step 540.

At step 540, the post-processor 116 determines whether the alarm system 100 is associated with an active alarm monitoring account. In other words, the post-processor 116 determines whether the alarm system 100 is associated with a customer account in good standing, for example. Among other aspects, the standing of a customer's account may be dependent upon an account balance for services rendered or a payment schedule of the customer. If the alarm system 100 is not associated with a customer account in good standing, the post-processor 116 proceeds to step 570 and it is determined that no two-way voice channel is to be opened. In this case, no voice channel is to be opened between the alarm system 100 and the central alarm monitoring system 130 because the alarm system 100 is associated with a customer account that is not in good standing. Alternatively, if the alarm system 100 is associated with a customer account in good standing, the process proceeds to step 550.

At step 550, the post-processor 116 determines whether the alarm system 100 is capable of and configured for establishing a two-way voice channel between the alarm system 100 and the central alarm monitoring station 130. In one aspect, the post-processor 116 determines whether the alarm system 100 comprises the hardware necessary to facilitate the establishment of a voice channel. The post-processor 116 may cross-reference a serial number of the alarm system 100 with data stored in the database 120 to determine whether the alarm system 100 comprises the hardware required to establish a voice channel. In this context, the database 120 may store a list of hardware configurations of several different models of alarm systems which comprise the hardware necessary to establish a voice channel for reference by the post-processor 116.

In another aspect, the post-processor 116 determines whether the alarm system 100 is configured for two-way voice functionality. It is noted that, although an alarm system may comprise the hardware necessary to establish a voice channel, customers and/or service providers may choose not to use the two-way voice functionality of the alarm system. Even for alarm systems comprising the hardware for establishing a voice channel, the voice feature may be disabled at the alarm panel of the alarm system or according to one or more parameters stored in the database 120, for example. If the alarm system 100 does not comprise the hardware necessary for establishing a voice channel or is not configured for two-way voice functionality, the post-processor 116 proceeds to step 570 and it is determined that no two-way voice channel is to be opened. Alternatively, if the alarm system 100 comprises the hardware necessary for establishing a voice channel and is configured for two-way voice functionality, the process proceeds to step 560.

At step 560, the post-processor 116 determines whether the alarm event requires a voice channel. In other words, the post-processor 116 evaluates the alarm event data to determine whether the alarm event data includes an alarm event code such as a fire, burglary, or other medical emergency code for which a voice channel may be desirable. In some cases, the alarm event data may indicate that the alarm event is associated with a system failure, such as a furnace or air conditioner failure. In these cases, a voice channel is unlikely to be beneficial to the agent 140 because of the lack of ambient sounds to interpret and individuals to speak with. In one embodiment, the post-processor 116 determines that a voice channel is required for any alarm event data associated with a fire, panic, burglary, or medical emergency. If the alarm event data is not associated with a fire, panic, burglary, or other medical emergency, the post-processor 116 proceeds to step 570 and it is determined that no two-way voice channel is to be opened. Alternatively, if the alarm event data is associated with a fire, panic, burglary, or other medical emergency, the process proceeds to step 580 and it is determined that the two-way voice channel is to be opened.

Thus, a voice channel is opened between the alarm system 100 and the central alarm monitoring station 130 based on the evaluation by the message processing gateway 110 of the service parameters and the alarm event data of the alarm system 100. As noted above, the voice channel is not opened automatically for all alarm events. For example, as discussed above, even if a burglary is detected, no voice channel is opened if the alarm system 100 is configured not to open a voice channel according to the decision at step 550. As another example, even if a burglary is detected, no voice channel is opened if an account of the alarm system 100 is inactive or not in good standing according to the decision at step 540. As such, customers and service operators of alarm systems according to the system and method described herein are able to carefully define the conditions under which voice channels are opened, reducing costs as compared to conventional systems and methods.

With reference again to FIG. 2, the process turns to either step 250 when no voice channel is to be opened or to step 270 when a voice channel is to be opened, according to the evaluation at step 230 and the decision at step 240. As compared to step 250, the alarm event data is forwarded at step 270 with a voice channel code, as discussed above, to direct the central alarm monitoring station 130 to maintain an open voice channel, which is later bridged to the alarm system 100.

The message processing gateway 110 and the private branch telecommunications switch may be located at separate geographic locations. Alternatively, the message processing gateway 110 and the private branch telecommunications switch 120 may be integrated into a single computing device at one location, as designated by the hashed outline 150. In this case, the dialer bank 118 may be merged with the communications banks 124, 126, and 128 or omitted in favor of the communications banks 124, 126, and 128.

Figure 6:
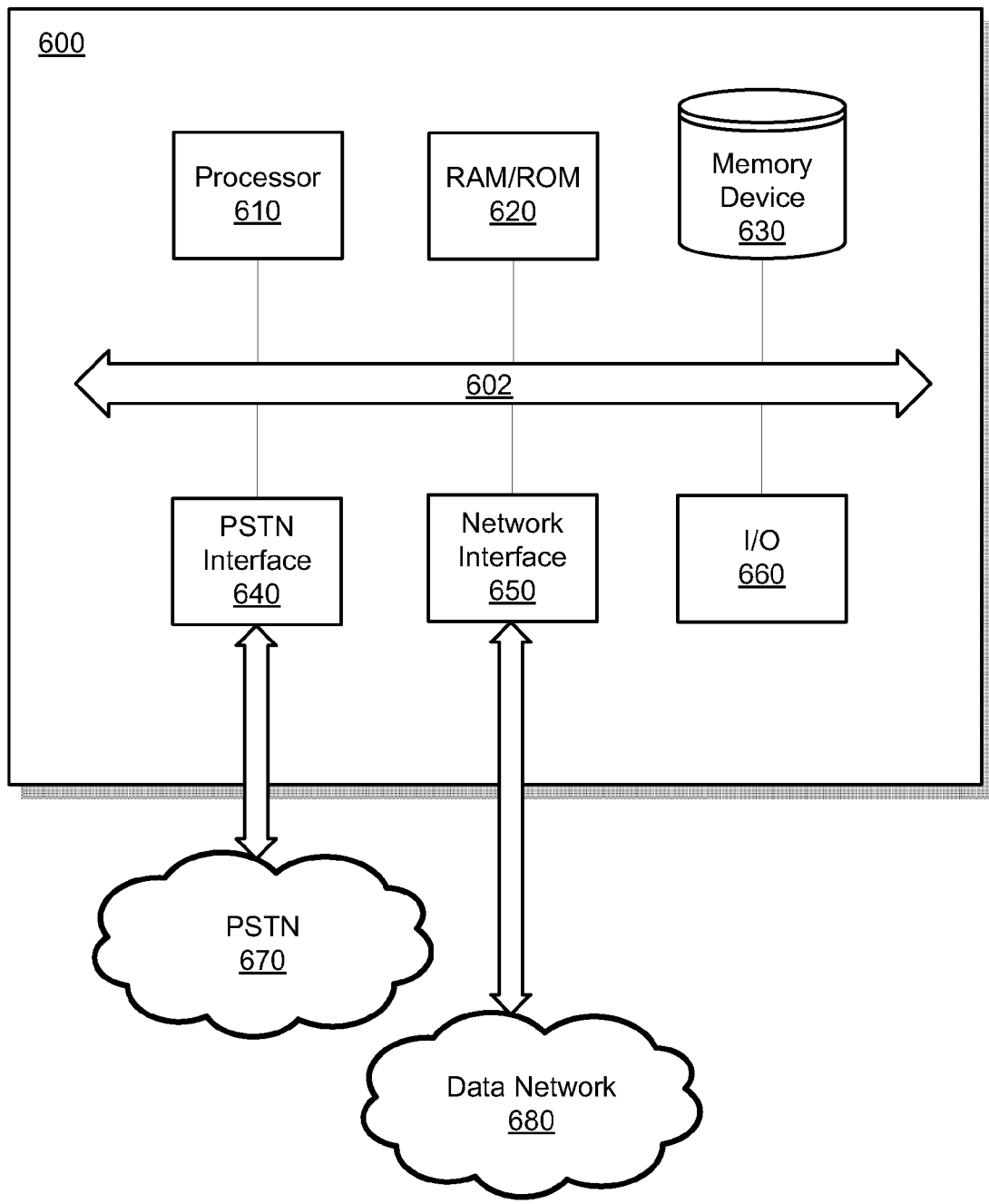
FIG. 6 illustrates a general purpose computer to implement one or more elements of a system for efficient delivery of alarm system event data and audio over hybrid networks.

Turning to FIG. 6, an example hardware diagram of a general purpose computer 600 is illustrated. Any of the alarm system 100, the message processing gateway 110, the private branch telecommunications switch 120, and the central alarm monitoring system 130 may be implemented, in part, using one or more elements of the general purpose computer 600. The computer 600 includes a processor 610, a Random Access Memory ("RAM")/Read Only Memory ("ROM") 620, a memory device 630, a PSTN interface 640, a network interface 650, and an Input Output ("I/O") interface 660. The elements of the computer 600 are communicatively coupled via a bus 602.

The processor 610 comprises any well known general purpose arithmetic processor or Application Specific Integrated Circuit ("ASIC"). The RAM/ROM 620 comprises any well known random access or read only memory device that stores computer-readable instructions to be executed by the processor 610. The memory device 630 stores computer-readable instructions thereon that, when executed by the processor 610, direct the processor 610 to execute various aspects of the present invention described herein. When the processor 610 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 630 comprises one or more of an optical disc, a magnetic disc, a semiconductor memory (i.e., a flash based memory), a magnetic tape memory, a removable memory, combinations thereof, or any other known memory means for storing computer-readable instructions. The PSTN interface 640 and the network interface 650 comprise hardware interfaces to communicate over the PSTN and data networks, respectively. The I/O interface 660 comprises device input and output interfaces such as keyboard, pointing device, display, communication, and other interfaces. The bus 602 electrically and communicatively couples the processor 610, the RAM/ROM 620, the memory device 630, the PSTN interface 640, the network interface 650, and the I/O interface 660, so that data and instructions may be communicated among them. In operation, the processor 610 is configured to retrieve computer-readable instructions stored on the memory device 640, the RAM/ROM 620, or another storage means, and copy the computer-readable instructions to the RAM/ROM 620 for execution. The processor 610 is further configured to execute the computer-readable instructions to implement various aspects and features of the present invention. For example, the processor 610 may be adapted and configured to execute the processes described above with reference to FIGS. 3-5, including the processes described as being performed by the post-processor 116. Also, the memory device 630 may store the data stored in the database 120.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method comprising:
    receiving alarm event data transmitted by an alarm system;
    opening a first voice channel between a telecommunications switch and a central monitoring station and communicating the alarm event data to the central monitoring station;
    determining whether the opened first voice channel remains open after the communicating of the alarm event data to the central monitoring station by determining whether the central monitoring station has maintained the first voice channel open after the central monitoring station acknowledges receipt of the alarm event data;
    opening a second voice channel between the alarm system and the telecommunications switch, only after opening the first voice channel and determining that the opened first voice channel remains open after the communicating of the alarm event data to the central monitoring station; and
    bridging the first voice channel and the second voice channel to form a bridged voice channel between the alarm system and the central monitoring station.

2. The method of claim 1, wherein transmitting the alarm event data to the telecommunications switch comprises communicating using application programming interface (API) web services.

3. The method of claim 1, wherein transmitting the alarm event data to the telecommunications switch comprises transmitting the alarm event data over the Internet.

4. The method of claim 1, wherein receiving the alarm event data comprises receiving the alarm event data at a gateway that serves a network of alarm systems, including the alarm system,
    wherein the gateway and the telecommunications switch comprise separate computing devices, and
    wherein a communications link communicatively couples the gateway and the telecommunications switch to one another.

5. The method of claim 1, wherein receiving the alarm event data comprises receiving the alarm event data at a gateway, and
    wherein the gateway and the telecommunications switch are integrated into a single commuting device.

6. The method of claim 1, wherein the telecommunications switch comprises a private branch telecommunications switch.

7. The method of claim 1, wherein the telecommunications switch comprises a plurality of proxies.

8. The method of claim 1, wherein opening the second voice channel between the alarm system and the telecommunications switch comprises transmitting a routing code from the telecommunications switch for receipt by the alarm system.

9. The method of claim 1, wherein bridging the first voice channel and the second voice channel comprises establishing a full-duplex voice-band audio link between the alarm system and the central monitoring station.

10. The method of claim 1, further comprising transmitting the alarm event data from a message processing gateway to the central monitoring station.

11. The method of claim 1, further comprising:
    responsive to receiving the alarm event data transmitted by the alarm system, evaluating service parameters of the alarm system and conditions of the alarm event data to determine whether to open a two-way voice channel between the alarm system and the central monitoring station; and
    if the two-way voice channel between the alarm system and the central monitoring station is determined to be opened, then opening the two-way voice channel by:
        transmitting the alarm event data and a voice channel code to the telecommunications switch;
        opening the first voice channel between the telecommunications switch and the central monitoring station;
        opening the second voice channel between the alarm system and the telecommunications switch; and
        bridging the first voice channel and the second voice channel.

12. A method comprising the steps of:
    receiving alarm event data originating at an alarm system;
    conducting an evaluation of service parameters of the alarm system and conditions of the alarm event data;
    based on the evaluation, determining whether to open a two-way voice channel between the alarm system and an alarm monitoring station that is staffed with agents; and
    responsive to determining to open the two-way voice channel, performing the steps of:

opening a first voice channel between a telecommunications switch and the alarm monitoring station and communicating the alarm event data to the alarm monitoring station;

determining whether the opened first voice channel remains open after the communicating of the alarm event data to the alarm monitoring station by monitoring for a disconnection after the alarm monitoring station acknowledges receipt of the alarm event data and in response to a determination that the opened first voice channel remains open after the communication of the alarm event data to the alarm monitoring station, opening a second voice channel between the alarm system and the telecommunications switch, and bridging the first and second voice channels.

13. The method of claim 12, wherein the step of receiving the alarm event data originating at the alarm system comprises receiving, by a message processing gateway, the alarm event data originating at the alarm system;

wherein the step of conducting the evaluation of service parameters of the alarm system and conditions of the alarm event data comprises conducting, by the message processing gateway, the evaluation of service parameters of the alarm system and conditions of the alarm event data; and wherein the step of based on the evaluation, determining whether to open the two-way voice channel between the alarm system and the alarm monitoring station comprises based on the evaluation, determining, by the message processing gateway, whether to open the two-way voice channel between the alarm system and the alarm monitoring station.

14. The method of claim 13, wherein opening the second voice channel between the alarm system and the telecommunications switch comprises:

by the telecommunications switch, determining a routing code for the second voice channel and sending the routing code to the message processing gateway; and by the message processing gateway, sending the routing code to the alarm system via a data channel.

15. The method of claim 14, wherein sending the routing code to the message processing gateway comprises sending the routing code over the Internet using an API link.

16. The method of claim 14, wherein the message processing gateway and the telecommunications switch comprise separate computing devices.

17. The method of claim 14, wherein one computing device comprises the message processing gateway and the telecommunications switch.

18. A method comprising the steps of:

receiving, at a gateway, data from an alarm system about an alarm event;

processing the received data at the gateway to determine whether to open a voice channel between the alarm system and a central monitoring station; and responsive to a determination at the gateway to open the voice channel between the alarm system and the central monitoring station, performing the steps of:

sending, by the gateway, the data to a telecommunications switch;

causing the telecommunications switch to send the data to the central monitoring station and to open a second voice channel between the telecommunications switch and the central monitoring station;

determining whether the opened second voice channel between the telecommunications switch and the central monitoring station remains open after sending the data to the central monitoring station by monitoring for a disconnection after the central monitoring station acknowledges receipt of the data from the telecommunications switch; and if the second voice channel between the telecommunications switch and the central monitoring station is determined to remain open after sending the data to the central monitoring station, then:

receiving, by the gateway, a routing code from the telecommunications switch, wherein the routing code is for establishing a third voice channel between the alarm system and the telecommunications switch; and sending, by the gateway, the routing code to the alarm system, wherein the voice channel comprises the second voice channel and the third voice channel.

19. The method of claim 18, wherein the telecommunications switch and the gateway are separate devices linked together via a packet-switched network.

20. The method of claim 18, wherein the step of processing the received data at the gateway to determine, by the gateway, whether to open the voice channel between the alarm system and the central monitoring station comprises evaluating service parameters of the alarm system and conditions of the received data.

21. A system comprising:

a gateway that serves an alarm system and a plurality of other alarm systems, the gateway configured to:

receive data from the alarm system about an alarm event;

process the received data to determine whether to open a voice channel between the alarm system and a central monitoring station;

responsive to a determination to open the voice channel between the alarm system and the central monitoring station, send a communication to a telecommunications switch; and send to the alarm system a routing code for establishing a voice channel between the alarm system and the telecommunications switch; and the telecommunications switch communicatively coupled to the gateway, the telecommunications switch configured to:

responsive to receiving the communication, perform the steps of:

opening a voice channel between the telecommunications switch and the central monitoring station;

determining whether the opened voice channel between the telecommunications switch and the central monitoring station remains open after communication of the data to the central monitoring station by monitoring for a disconnection after the central monitoring station acknowledges receipt of the data from the telecommunication switch; and responsive to determining that the opened voice channel between the telecommunications switch and the central monitoring station remains open, producing the routing code and sending the routing code to the gateway;

wherein the voice channel between the alarm system and the central monitoring station comprises:

the voice channel between the alarm system and the telecommunications switch; and the voice channel between the telecommunications switch and the central monitoring station.

22. The system of claim 21, wherein sending the communication to the telecommunications switch comprises sending the data to the telecommunications switch, and
wherein the telecommunications switch is further configured to forward the data to the central monitoring station.

23. The system of claim 21, wherein the telecommunications switch and the gateway are communicatively coupled to one another via the Internet.

24. The system of claim 21, wherein the telecommunications switch and the gateway are collocated.

25. The system of claim 21, wherein processing the received data to determine whether to open the voice channel between the alarm system and the central monitoring station comprises evaluating service parameters of the alarm system and conditions of the received data.

26. The system of claim 21, wherein the telecommunications switch comprises a private branch telecommunications switch.

27. The system of claim 21, wherein the telecommunications switch comprises a plurality of proxies.

28. The system of claim 21, wherein the telecommunications switch is further configured to perform the step of opening the voice channel between the telecommunications switch and the central monitoring station prior to performing the step of sending the routing code to the gateway.

\* \* \* \* \*